United States Patent
Han et al.

(10) Patent No.: US 9,507,109 B2
(45) Date of Patent: *Nov. 29, 2016

(54) OPTICAL MODULES

(71) Applicant: ELECTRONICS AND TELECOMMUNICATIONS RESEARCH INSTITUTE, Daejeon (KR)

(72) Inventors: Young-Tak Han, Daejeon (KR); Jang Uk Shin, Daejeon (KR); Sang-Pil Han, Daejeon (KR); Sang Ho Park, Daejeon (KR); Yongsoon Baek, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/987,808

(22) Filed: Jan. 5, 2016

(65) Prior Publication Data

US 2016/0116694 A1  Apr. 28, 2016

Related U.S. Application Data

(62) Division of application No. 14/724,147, filed on May 28, 2015, now Pat. No. 9,256,038, which is a division of application No. 14/294,603, filed on Jun. 3, 2014, now Pat. No. 9,069,146, which is a division of application No. 13/154,859, filed on Jun. 7, 2011, now Pat. No. 8,774,568.

(30) Foreign Application Priority Data

Nov. 19, 2010 (KR) .................. 10-2010-0115478

(51) Int. Cl.
  *G02B 6/12* (2006.01)
  *G02B 6/42* (2006.01)
  *G02B 6/32* (2006.01)

(52) U.S. Cl.
  CPC ......... *G02B 6/4279* (2013.01); *G02B 6/12002* (2013.01); *G02B 6/12004* (2013.01);
  (Continued)

(58) Field of Classification Search
  CPC ........... G02B 6/4279; G02B 6/12002; G02B 6/12004; G02B 6/325; G02B 6/4257; G02B 6/4281; G02B 2006/12092
  USPC ............. 385/14–15; 398/135–139, 140–141, 398/182–201
  See application file for complete search history.

(56) References Cited

U.S. PATENT DOCUMENTS

| | | | |
|---|---|---|---|
| 6,813,102 B2 | 11/2004 | Furuichi et al. | |
| 6,892,449 B1* | 5/2005 | Brophy ................ | G02B 6/4206 257/680 |
| 6,950,314 B2* | 9/2005 | Reznik .................. | H01R 12/62 174/254 |

(Continued)

FOREIGN PATENT DOCUMENTS

| | | |
|---|---|---|
| JP | 2003-303975 A | 10/2003 |
| KR | 10-2004-0019125 A | 3/2004 |
| KR | 10-2005-0027960 A | 3/2005 |

OTHER PUBLICATIONS

Dongchurl Kim et al., "Design and Fabrication of a Transmitter Optical Subassembly (TOSA) in 10-Gb/s Small-Form-Factor Pluggable (XFP) Transceiver", IEEE Journal of Selected Topics in Quantum Electronics, vol. 12, No. 4, pp. 776-782, Jul./Aug. 2006.

(Continued)

*Primary Examiner* — Ryan Lepisto
*Assistant Examiner* — Guy Anderson
(74) *Attorney, Agent, or Firm* — Rabin & Berdo, P.C.

(57) ABSTRACT

Provided is an optical module. The optical module includes: an optical bench having a first trench of a first depth and a second trench of a second depth that is lower than the first depth; a lens in the first trench of the optical bench; at least one semiconductor chip in the second trench of the optical bench; and a flexible printed circuit board covering an upper surface of the optical bench except for the first and second trenches, wherein the optical bench is a metal optical bench or a silicon optical bench.

12 Claims, 4 Drawing Sheets

(52) U.S. Cl.
CPC ............. *G02B6/325* (2013.01); *G02B 6/4206* (2013.01); *G02B 6/4208* (2013.01); *G02B 6/4257* (2013.01); *G02B 6/4265* (2013.01); *G02B 6/4271* (2013.01); *G02B 6/4281* (2013.01); *G02B 6/42* (2013.01); *G02B 6/4201* (2013.01); *G02B 6/428* (2013.01); *G02B 2006/12092* (2013.01); *G02B 2006/12135* (2013.01)

(56) References Cited

U.S. PATENT DOCUMENTS

| | | | | |
|---|---|---|---|---|
| 7,036,999 B2* | 5/2006 | Schrodinger | ........ | G02B 6/4214 257/E25.032 |
| 7,129,163 B2* | 10/2006 | Sherrer | ............... | G02B 6/4201 438/637 |
| 7,329,056 B2* | 2/2008 | Sherrer | ............... | G02B 6/4201 385/88 |
| 7,330,648 B2* | 2/2008 | Morinaga | ............... | G02B 7/026 348/240.3 |
| 7,382,946 B2* | 6/2008 | Oggioni | .................. | G02B 6/43 174/260 |
| 7,449,784 B2* | 11/2008 | Sherrer | ............... | G02B 6/4201 257/678 |
| 7,508,065 B2* | 3/2009 | Sherrer | ............... | G02B 6/4201 257/704 |
| 7,565,084 B1* | 7/2009 | Wach | ..................... | H04J 14/04 398/183 |
| 7,888,793 B2* | 2/2011 | Sherrer | ............... | G02B 6/4201 257/712 |
| 2003/0189770 A1* | 10/2003 | Furuichi | ............ | H01S 5/02252 359/819 |
| 2005/0244095 A1* | 11/2005 | Ellison | ................ | G02B 6/4246 385/14 |
| 2005/0265650 A1 | 12/2005 | Priyadarshi et al. | | |
| 2006/0032665 A1* | 2/2006 | Ice | ........................ | H05K 1/028 174/254 |
| 2007/0009213 A1* | 1/2007 | Meadowcroft | ...... | G02B 6/4201 385/92 |
| 2008/0285110 A1* | 11/2008 | Terashima | ........... | G02B 6/4204 359/245 |
| 2009/0080831 A1* | 3/2009 | Nakamura | ............. | G02B 6/423 385/14 |
| 2009/0107630 A1* | 4/2009 | Lamprecht | ............... | G02B 6/10 156/289 |
| 2012/0128290 A1 | 5/2012 | Han et al. | | |

OTHER PUBLICATIONS

H. Oomori et al., "An extremely compact electro-absorption modulator integrated DFB laser module for 100Gbps ethernet over 75km SMF reach", ECOC 2008, 21-25, vol. 5, pp. 65-66, Sep. 2008.

* cited by examiner

OPTICAL MODULES

CROSS-REFERENCE TO RELATED APPLICATIONS

This is a division of U.S. application Ser. No. 14/724,147, filed May 28, 2015, which is a division of U.S. application Ser. No. 14/294,603, filed Jun. 3, 2014 (now U.S. Pat. No. 9,069,146, issued Jun. 30, 2015), which is a division of U.S. application Ser. No. 13/154,859, filed Jun. 7, 2011 (now U.S. Pat. No. 8,774,568, issued Jul. 8, 2014). Further, this application claims priority to Korean Application No. 10-2010-0115478, filed Nov. 19, 2010. The disclosure of these U.S. and Korean applications are incorporated herein by reference.

BACKGROUND OF THE INVENTION

The present invention disclosed herein relates to optical modules, and more particularly, to optical modules for transmitting a high frequency signal.

In order to transmit and process a high frequency signal in a optical transmission or/and optical reception module(s) of more than about 10 Gbps, a ceramic submount is used inside a metal package and a Flexible Printed Circuit Board (FPCB) is used outside the metal package. In the ceramic submount and the FPCB, an electrode of a CoPlanar Waveguide (CPW) form is used. Also, in order to transmit a high frequency signal without reflection, a termination matching resistor is integrated on the ceramic submount with a thin-film type and in order to prevent distortion phenomenon of a high frequency signal due to resonances, via holes that electrically connect an upper ground electrode and a lower ground electrode are formed. A process for forming the thin-film type termination matching resistor and the via holes on the ceramic submount requires high costs so that it accounts for a significant portion of the total cost for fabricating an optical module. Moreover, the forming of the thin-film type termination matching resistor of a high quality on the ceramic submount or the forming of the elaborate via holes requires high technology.

Furthermore, a ceramic feed-through is formed in a metallic package body according to an optical module structure using the ceramic submount so that a high frequency transmission line of the ceramic submount in the metallic package body is connected to a high frequency transmission line formed on the ceramic feed-through through bonding wires, and a high frequency transmission line of the FPCB at the outside of the metallic package is connected to a high frequency transmission line formed on the ceramic feed-through through soldering. Generally, if a high frequency signal is connected by bonding wires through a plurality of steps, it is reflected because of characteristic impedance mismatch, so that high frequency signal characteristics of an optical module are seriously deteriorated.

SUMMARY OF THE INVENTION

The present invention provides an optical module for minimizing mismatch of characteristic impedance and improving a high frequency signal characteristic by suppressing high frequency resonances.

Embodiments of the present invention provide optical modules including: an optical bench having a first trench of a first depth and a second trench of a second depth that is lower than the first depth; a lens in the first trench of the optical bench; at least one semiconductor chip in the second trench of the optical bench; and a flexible printed circuit board covering an upper surface of the optical bench except for the first and second trenches, wherein the optical bench is a metal optical bench or a silicon optical bench.

In some embodiments, the optical modules may further include a thermo-electric cooler unit contacting on an entire lower surface of the optical bench, which faces the flexible printed circuit board.

In other embodiments, the optical modules may further include a metal package component surrounding the optical bench having the lens and the semiconductor chip and the flexible printed circuit board to protect them from an external environment.

In still other embodiments, the metal package component may have a slit; and the flexible printed circuit board may extend to an external of the metal package component through the slit.

In even other embodiments, a ceramic feed-through may be provided in the metal package component; the ceramic feed-through may be electrically connected to an external flexible printed circuit board outside the metal package component; and the flexible printed circuit board may be electrically connected to the ceramic feed-through inside the metal package component.

In yet other embodiments, the flexible printed circuit board may be electrically connected to the ceramic feed-through through a ribbon wire or a bonding wire; and the external flexible printed circuit board may be electrically connected to the ceramic feed-through through soldering.

In further embodiments, the metal package component may include a receptacle for connecting to an external ferrule, with a window adjacent to the lens.

In still further embodiments, the optical modules may further include a matching resistor on the flexible printed circuit board.

In even further embodiments, the semiconductor chip may include at least one of an electro-absorption modulated laser, a capacitor, a photodiode, a laser diode, or a thermistor.

In yet further embodiments, the flexible printed circuit board may include: a conductive line; a lower ground line; and an insulation layer between the conductive line and the lower ground line, wherein the conductive line includes a signal transmission line, an upper ground line, and an electrode line.

In yet further embodiments, the flexible printed circuit board may have via holes for electrically connecting the upper ground line with the lower ground line; and the upper ground line and the lower ground line may be electrically connected to each other through a conductive material filling at least a portion of the via holes.

In yet further embodiments, the lower ground line of the flexible printed circuit board may be electrically connected to the optical bench.

In yet further embodiments, the signal transmission line and the upper ground line may be a coplanar waveguide or a microstrip line.

In yet further embodiments, the insulation layer may have a dielectric constant of about 2 to about 4 and may have a dissipation factor of about 0.001 to about 0.05.

In yet further embodiments, the insulation layer may include a polyimide or Teflon.

In yet further embodiments, the insulation layer may have a thickness of about 20 μm to about 80 μm.

In yet further embodiments, the metal optical bench may include one of copper-tungsten, copper, kovar, an aluminum alloy, or a combination thereof.

In yet further embodiments, the silicon optical bench may include: a silicon substrate; and a gold plating layer on the silicon substrate.

In yet further embodiments, the lens may be a lens fixed with a metal housing or a lens of a bare chip shape.

In other embodiments of the present invention, optical modules include: a thermo-electric cooler unit; a first optical bench with a lens on the thermo-electric cooler unit; a second optical bench with a trench, contacting on the first optical bench except for a region with the lens; at least one semiconductor chip in the trench of the second optical bench; a flexible printed circuit board covering an upper surface of the second optical bench except for the trench; and a metal package component surrounding the thermo-electric cooler unit, the first optical bench with the lens, the second optical bench with the semiconductor chip, and the flexible printed circuit board to protect them from an external environment, wherein the first and second optical benches are a metal optical bench or a silicon optical bench.

In still other embodiments of the present invention, optical modules include: a thermo-electric cooler unit; a first optical bench with a lens on the thermo-electric cooler unit; a second optical bench with a trench on the thermo-electric cooler unit, being spaced from the first optical bench; at least one semiconductor chip in the trench of the second optical bench; a flexible printed circuit board covering an upper surface of the second optical bench except for the trench; and a metal package component surrounding the thermo-electric cooler unit, the first optical bench with the lens, the second optical bench with the semiconductor chip, and the flexible printed circuit board to protect them from an external environment, wherein the first and second optical benches are a metal optical bench or a silicon optical bench.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
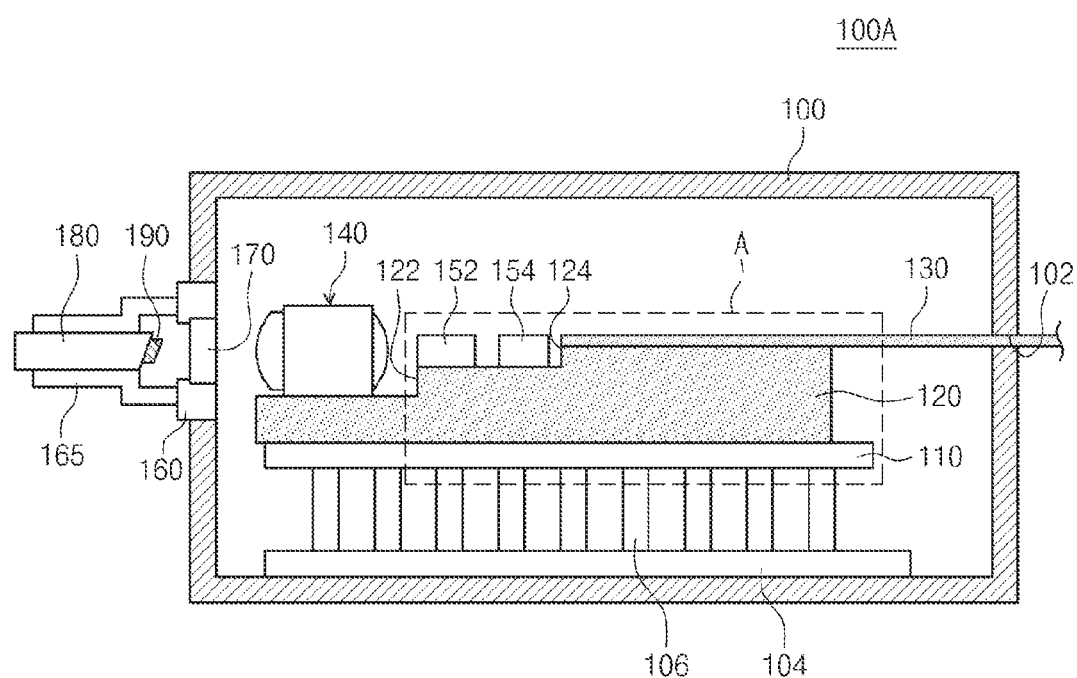
FIG. 1 is a sectional view of a schematic configuration illustrating an optical module according to an embodiment of the present invention.

Preferred embodiments of the present invention will be described below in more detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description, the technical terms are used only for explaining specific embodiments while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components. It will be understood that when an element such as a layer, film, region, or substrate is referred to as being "on" another element, it can be directly on the other element or intervening elements may also be present.

Additionally, the embodiment in the detailed description will be described with sectional views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the present invention.

Figure 2:
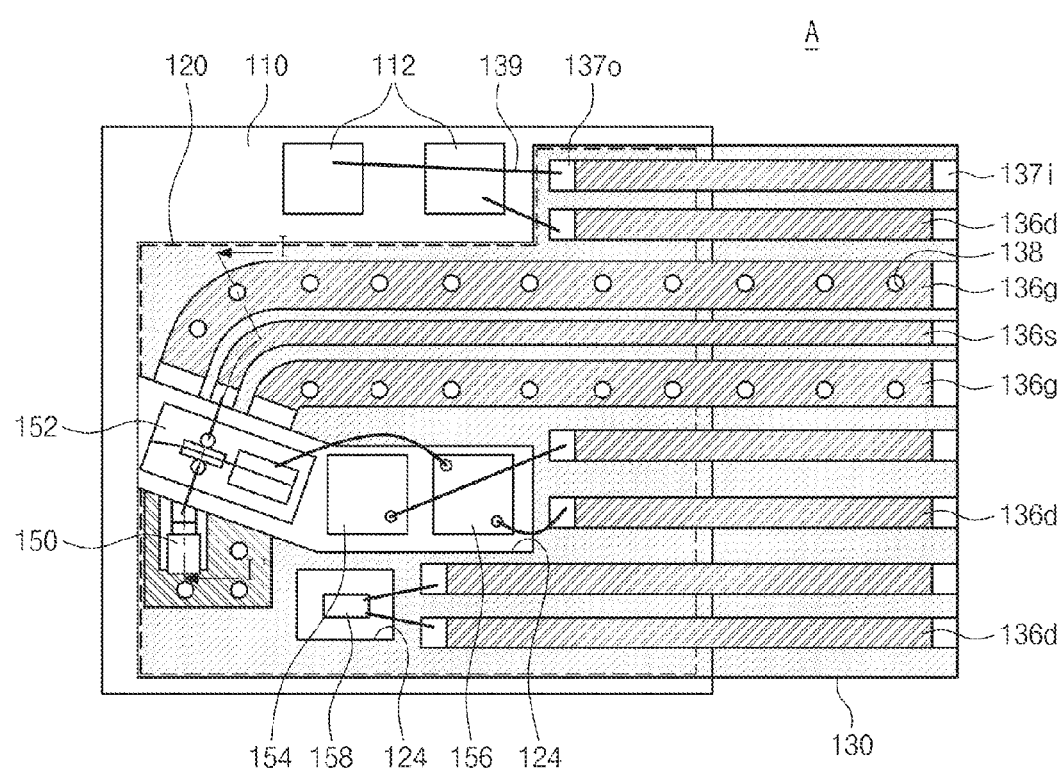
FIG. 2 is a plan view of a schematic configuration illustrating a portion A of FIG. 1 to describe an optical module according to embodiments of the present invention.
Figure 3:
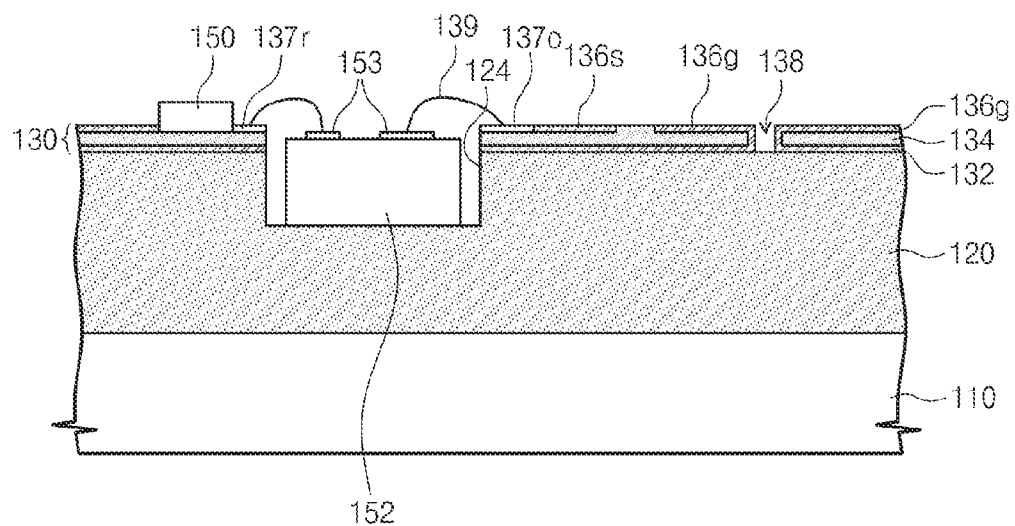
FIG. 3 is a sectional view taken along the line I-I' of FIG. 2 to describe an optical module according to embodiments of the present invention.

FIG. 1 is a sectional view of a schematic configuration illustrating an optical module according to an embodiment of the present invention. FIG. 2 is a plan view of a schematic configuration illustrating a portion A of FIG. 1 to describe an optical module according to embodiments of the present invention. FIG. 3 is a sectional view taken along the line I-I' of FIG. 2 to describe an optical module according to embodiments of the present invention.

Referring to FIGS. 1 through 3, the optical module 100A includes a Thermo-Electric Cooler (TEC) 110, an optical bench 120, a lens 140, semiconductor chips 152, 154, 156, and 158, a Flexible Printed Circuit Board (FPCB) 130, a matching resistor 150, and a metal package component 100.

The micro-sized TEC 110 is provided in the metal package component 100. The TEC 110 may be provided in the metal package component 100 by a support plate 104 and a support pillar 106. Typically, the support plate 104 and the support pillar 106 may be included in the TEC 110. That is, the support plate 104, the support pillar 106, and the TEC 110 may be one thermo-electric device structure. This may be used to maintain a uniform internal temperature of the optical module 100A and also may secure stable operation of the optical module 100A.

The optical bench 120 is provided on the TEC 110. The optical bench 120 may have a first trench 122 and a second trench 124. The first trench 122 may have a first depth and the second trench 124 may have a second depth lower than the first depth. The optical bench 120 may use a metallic material having excellent thermal conductivity and electrical conductivity and small thermal expansion. The optical bench 120 may be a Metal Optical Bench (MOB) or a Silicon Optical Bench (SiOB). The MOB may include at least one of copper-tungsten (CuW), copper, kovar, an Al alloy, or a combination thereof. A gold plating layer may be additionally provided on the surface of the MOB to further improve electrical conductivity. The SiOB may include a silicon substrate and a gold plating layer on the silicon substrate. The silicon substrate may have excellent thermal conductivity and the gold plating layer may improve electrical conductivity.

The lens 140 and the semiconductor chips 152, 154, 156, and 158 may be provided in the first trench 122 and the second trench 124 of the optical bench 120, respectively. The second depth of the second trench 124 may be substantially identical to or less than the height of each of the semiconductor chips 152, 154, 156, and 158. The semiconductor chips 152, 154, 156, and 158 may include an Electroabsorption Modulated Laser (EML) 152, a PhotoDiode (PD) 154, a capacitor 156, a thermistor 158, or a laser diode (LD).

A pipe 160 having a window 170 for transmitting/receiving light and a receptacle 165 coupled to the pipe 160 to connect to an external ferrule 180 may be provided at a portion of the metal package component 100 adjacent to the lens 140. The window 170 may include sapphire. An isolator 190 may be provided between the ferrule 180 and the window 170.

The FPCB 130 having a signal transmission line 136*s* as a form of a CoPlanar Waveguide (CPW) or a MicroStrip Line (MSL) may be extend from the external of the metal package component 100 into the inside of the metal package component 100 having the semiconductor chips 152, 154, 156, and 158 through a slit 102 of the metal package component 100. The FPCB 130 may cover the upper surface of the optical bench 120 except the first and second trenches 122 and 124 in the metal package component 100. That is, a form of the FPCB 130 on the optical bench 120 may be a fabricated structure without the first and second trenches 122 and 124. The FPCB 130 extending to the outside of the metal package component 100 may be connected to an external Printed Circuit Board (PCB).

The semiconductor chips 152, 154, 156, and 158 may be fixed at the inside of the second trench 124 by using solder paste or silver paste having excellent thermal conductivity as a medium. The optical bench 120 may perform a thermal conductivity function and also perform a ground function of a high frequency signal, simultaneously. Moreover, the thermistor 158 needs to be disposed around the other semiconductor chips 152, 154, or 156 in order to achieve an accurate operation of the TEC 110, so that it is disposed in the second trench 124 together with the other semiconductor chips 152, 154, or 156. As a result, heat occurring at the other semiconductor chips 152, 154, and 156 may be accurately detected.

The FPCB 130 may be attached on the upper surface of the optical bench 120 using silver paste having excellent electrical conductivity. Accordingly, a lower ground line 132 of the FPCB 130 and the optical bench 120 may be formed to be electrically connected with the same ground.

The FPCB 130 may consist of conductive lines 136*d*, 136*g*, and 136*s*, an insulation layer 134, and the lower ground lines 132. The conductive lines 136*d*, 136*g*, and 136*s* of the FPCB 130 may include a signal transmission line 136*s*, upper ground lines 136*g*, and electrode lines 136*d*. The signal transmission line 136*s* and the upper ground lines 136*g* of the conductive lines 136*d*, 136*g*, and 136*s* of the FPCB 130 may have a form of the CPW or the micro strip line.

The insulation layer 134 of the FPCB 130 has a dielectric constant of about 2 to about 4 and a very low dissipation factor of about 0.001 to about 0.05. The insulation layer 134 of the FPCB 130 may include polyimide or Teflon appropriate for high frequency signal transmission. The insulation layer 134 of the FPCB 130 may have a thickness of about 20 μm to about 80 μm. Preferably, the insulation layer 134 of the FPCB 130 may have a thickness of about 50 μm. Moreover, the insulation layer 134 of the FPCB 130 may be formed of a material having the absorption characteristic with the low moisture absorption of less than about 3% in order to guarantee reliability.

Input/output pads (I/O pads) 137*i* and 137*o* for electrical connection with the semiconductor chips 152, 154, 156, and 158 integrated into the second trench of the optical bench 120 may be respectively provided on the tops of ends of the conductive lines 136*d*, 136*g*, and 136*s* of the FPCB 130. A gold plating layer may be additionally provided on the I/O pads 137*i* and 137*o* to improve bonding property. The output pads 137*o* of the electrode lines 136*d* of the FPCB 130 may be electrically connected to electrode pads 112 for the TEC 110 through bonding wires 139 and the output pads 137*o* of the signal transmission line 136*s* and the electrode lines 136*d* of the FPCB 130 may be electrically connected to the semiconductor chips 152, 154, 156, and 158 through bonding wires 139. In particular, the output pad 137*o* of the signal transmission line 136*s* of the FPCB 130 may be connected to electrode pad 153 for the EML 152 through ribbon wire.

Since the semiconductor chips 152, 154, 156, and 158 are integrated on the second trench 124 of the optical bench 120 and the FPCB 130 is provided around the second trench 124, electrical connection portions and connection paths between the semiconductor chips 152, 154, 156, and 158 and the FPCB 130 may be minimized. Accordingly, loss of a high frequency signal and impedance mismatch may be minimized.

The signal transmission line 136*s* and the upper ground lines 136*g* of the FPCB 130 may be a form of a Grounded CPW (GCPW) or a micro strip line. That is, the upper ground lines 136*g* and the lower ground lines 132 of the FPCB 130 are connected to each other to constitute the GCPW. If the GCPW is provided, via holes 138 may be further provided to suppress resonance phenomenon by equalizing electric potential of the upper ground lines 136*g* to that of the lower ground lines 132 of the GCPW. The via holes 138 may have a diameter of about 100 μm to about 250 μm and a distance between the respectively adjacent via holes 138 may be about 500 μm to about 900 μm. The via holes 138 may be easily formed through a tool drilling or laser drilling method. The upper ground lines 136*g* and the lower ground lines 132 of the GCPW may be electrically connected to each other through a conductive material filling at least a portion of the via holes 138.

The lens 140 for aligning and focusing the light emitted from the EML 152 into an optical fiber is integrated into the inside of the metal package component 100. The lens 140 may be fixed at the bottom of the first trench 122. The lens 140 may be a lens fixed with metal housing or a lens of a bare chip shape. If the lens 140 is the square lens of the bare chip shape, it may be fixed at the bottom of the first trench 122 of the optical bench 120 through epoxy or solder. Moreover, if the lens of the bare chip form is fixed at a Steel Us Stainless (SUS) ring, the lens 140 may be fixed at the bottom of the first trench 122 of the optical bench 120 through a laser welding method. At this point, the SUS ring outside the lens 140 and the surface of the optical bench 120 may be fixed through laser welding. Especially, if the lens 140 is fixed at the optical bench 120 through laser welding, the optical bench 120 formed of excellent laser welding materials may be used. The optical bench 120 may be the MOB using materials such as CuW, copper, and kovar.

The matching resistor 150 for termination without distortion of a high frequency signal may be provided in the FPCB 130 through soldering or flip-chip bonding. The matching resistor 150 may have a Surface Mount Device (SMD) applicable to a typical PCB. The matching resistor 150 may have a size of about 200 μm to about 600 μm as parasitic components such as parasitic capacitance or/and parasitic inductance are smaller in a high frequency. The matching resistor 150 may be electrically connected to the EML 152 through the bonding wire 139 connecting electrode pad 137$r$ for matching resistor 150 with electrode pad 153 for the EML 152.

Figure 4:
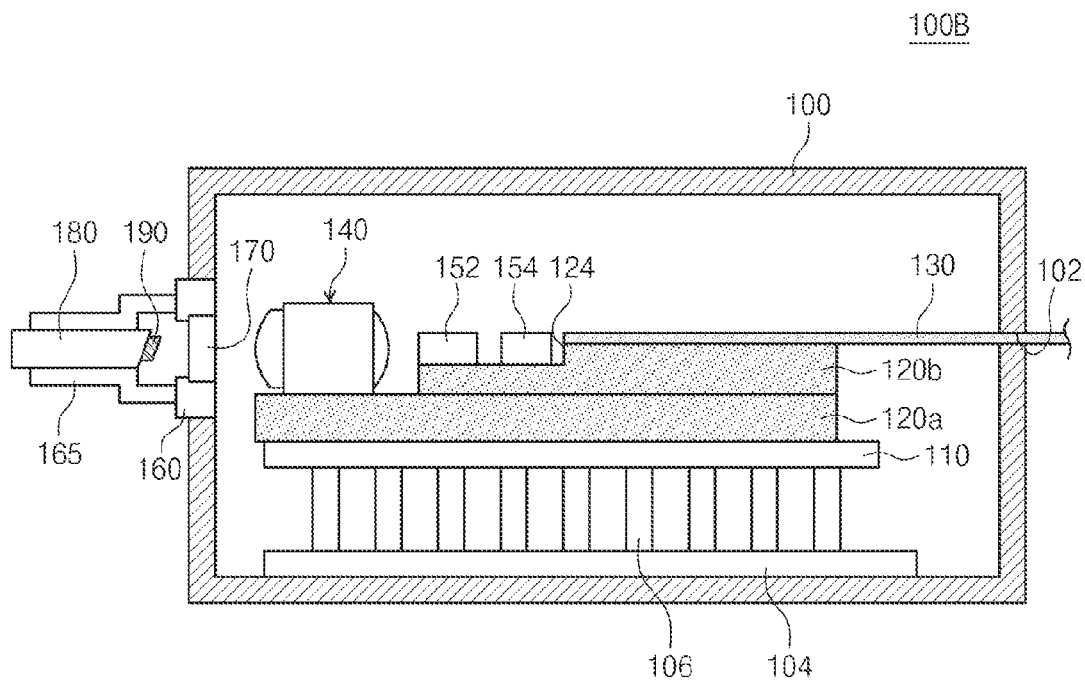
FIG. 4 is a sectional view of a schematic configuration illustrating an optical module according to another embodiment of the present invention.
Figure 5:
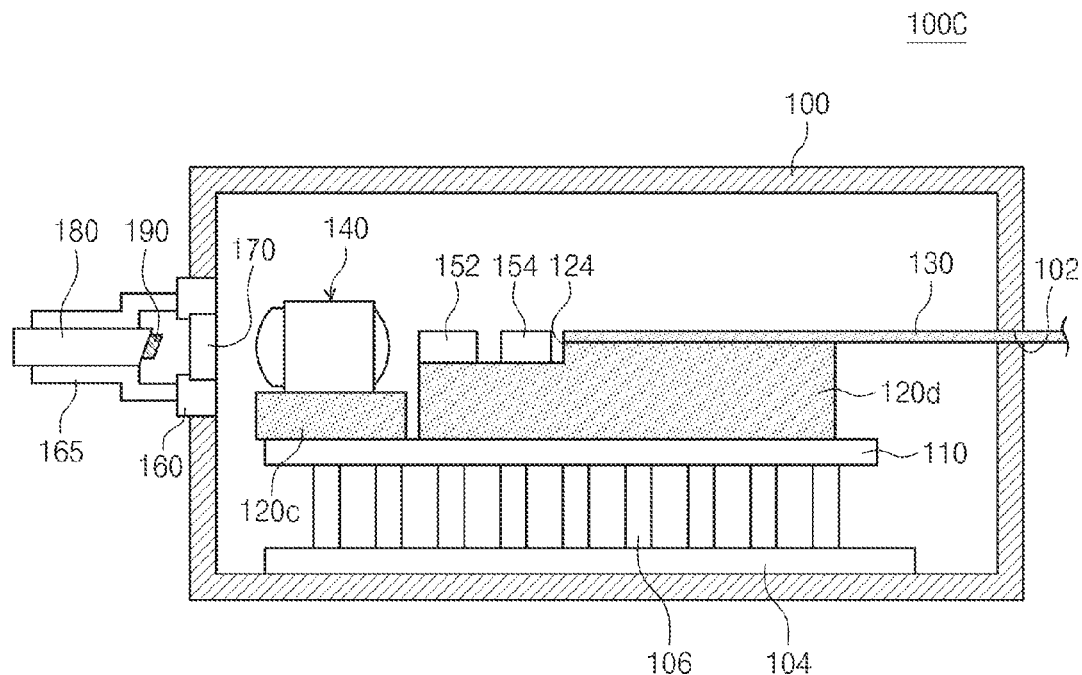
FIG. 5 is a sectional view of a schematic configuration illustrating an optical module according to further another embodiment of the present invention.
Figure 6:
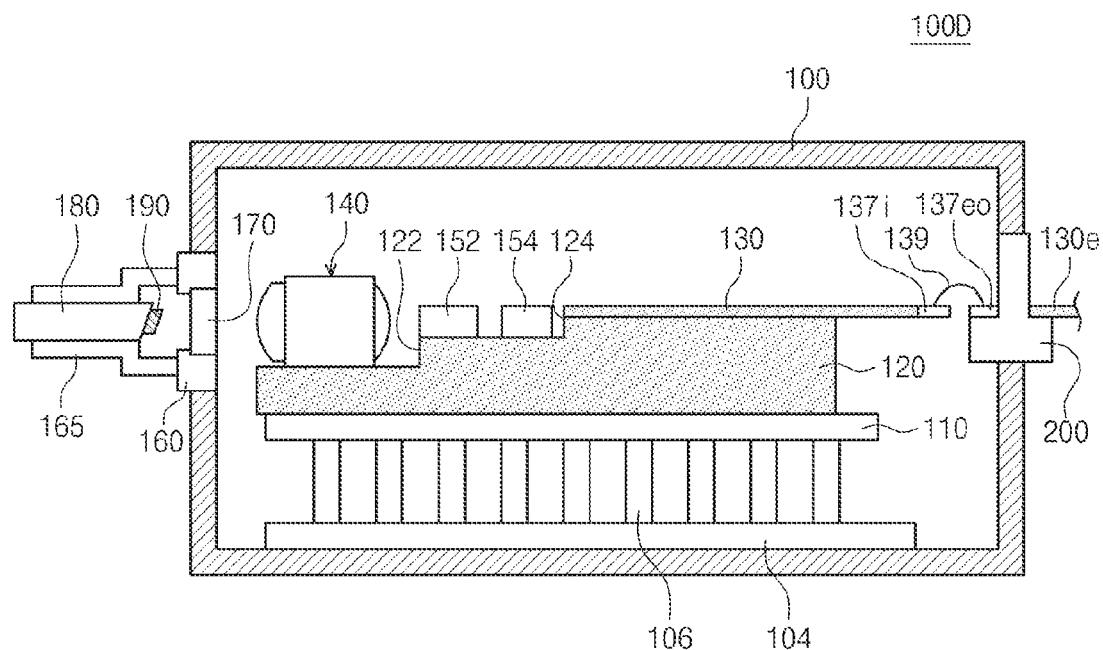
FIG. 6 is a sectional view of a schematic configuration illustrating an optical module according to further another embodiment of the present invention.

Hereinafter, referring to FIGS. 4 through 6, optical modules according to other embodiments of the present invention will be described. FIGS. 4 through 6 are sectional views of a schematic configuration of each optical module according to the embodiments of the present invention. Like elements refer to like numerical references throughout.

The difference between the optical module 100B according to another embodiment, described with reference to FIG. 4, and the optical module 100A according to the above embodiment is that a configuration of the optical bench is different.

The optical module 100B includes a TEC 110, first and second optical benches 120$a$ and 120$b$, a lens 140, semiconductor chips 152 and 154, and 156 and 158 of FIG. 2, an FPCB 130, the matching resistor 150 of FIG. 3, and a metal package component 100.

The lens 140 may be provided on the first optical bench 120$a$. The second optical bench 120$b$ having the trench 124 may be provided on the first optical bench 120$a$ except for a region having the lens 140. Inside the trench 124 of the second optical bench 120$b$, the semiconductor chips 152, 154, 156, and 158 may be provided. A method of providing the first optical bench 120$a$ and the second optical bench 120$b$ may be possible by a junction between the gold plating layers on the surface of the optical bench described in the above-mentioned embodiment. Additionally, the method of providing the second optical bench 120$b$ on the first optical bench 120$a$ may be possible by a junction applying silver paste between the gold plating layers of the first and second optical benches 120$a$ and 120$b$.

The difference between the optical module 100C according to another embodiment, described with reference to FIG. 5, and the optical module 100A according to the above embodiment is that a configuration of the optical bench is different.

The optical module 100C includes a TEC 110, first and second optical benches 120$c$ and 120$d$, a lens 140, semiconductor chips 152 and 154, and 156 and 158 of FIG. 2, an FPCB 130, the matching resistor 150 of FIG. 3, and a metal package component 100.

The lens 140 may be provided on the first optical bench 120$c$. The second optical bench 120$d$ spaced from the first optical bench 120$c$ with a trench 124 on the TEC 110 may be provided. The semiconductor chips 152, 154, 156 and 158 may be provided in the trench 124 of the second optical bench 120$d$.

The difference between the optical module 100D according to another embodiment, described with reference to FIG. 6, and the optical module 100A according to the above embodiment is that the PCB 130 is provided only in the metal package component 100.

The optical module 100D includes a TEC 110, a lens 140, semiconductor chips 152 and 154, and 156 and 158 of FIG. 2, an FPCB 130, the matching resistor 150 of FIG. 3, and a metal package component 100.

A ceramic feed-through 200 may be provided in the metal package component 100. The FPCB 130 may be electrically connected to an external FPCB 130$e$ through the ceramic feed-through 200 of the metal package component 100. That is, the FPCB 130 is connected in the metal package component 100 through pads 137$eo$ for the ceramic feed-through 200 and the external FPCB 130$e$ is electrically connected to the ceramic feed-through 200 outside the metal package component 100. The input pads 137$i$ of the FPCB 130 and the pads 173$eo$ for the ceramic feed-through 200 may be electrically connected to each other through a bonding wire 139. The external FPCB 130$e$ may electrically contact the ceramic feed-through 200 through soldering. That is, the FPCB 130 and the external FPCB 130$e$ are electrically connected to each other by using the ceramic feed-through 200 as a medium.

As mentioned above, an optical module according to embodiments of the present invention is electrically connected to FPCB for high frequency signal transmission by using an MOB or a SiOB with an easy trench formation so that mismatch of characteristic impedance may be minimized and high frequency resonance may be suppressed. Accordingly, a high frequency signal characteristic of an optical module may be improved. Moreover, characteristics of more than about 10 Gbps (especially, about 25 Gbps) may be improved. Furthermore, compared to a typical optical module using a ceramic submount, an optical module of the present invention may be technically easily fabricated with a lower cost. As a result, an optical module of low cost and high quality may be provided.

Furthermore, since the optical module according to embodiments of the present invention uses an MOB having a higher thermal conductivity than a typical ceramic submount, so that it may have improved heat dissipation characteristics and less power consumption. Accordingly, a highly reliable optical module may be provided.

Moreover, since the optical module according to embodiments of the present invention connects an MOB or a SiOB with a FPCB electrically, a matching resistor may be easily formed on the FPCB, unlike difficult and expensive manufacturing processes for forming a matching resistor for termination of a high frequency signal on a typical ceramic submount. Accordingly, an optical module of a low price and excellent quality may be provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical module comprising:
   an optical bench having a first trench of a first depth and a second trench of a second depth that is lower than the first depth;
   a lens in the first trench of the optical bench;

at least one semiconductor chip in the second trench of the optical bench;
a flexible printed circuit board covering an upper surface of the optical bench except for the first and second trenches; and
a metal package component surrounding the optical bench having the lens and the semiconductor chip and the flexible printed circuit board to protect them from an external environment,
wherein the optical bench is a metal optical bench or a silicon optical bench,
wherein a ceramic feed-through is provided in the metal package component;
the ceramic feed-through is electrically connected to an external flexible printed circuit board outside the metal package component; and
the flexible printed circuit board is electrically connected to the ceramic feed-through inside the metal package component.

2. The optical module of claim 1, wherein
the flexible printed circuit board is electrically connected to the ceramic feed-through through a ribbon wire or a bonding wire; and
the external flexible printed circuit board is electrically connected to the ceramic feed-through through soldering.

3. The optical module of claim 1, wherein the metal package component comprises a receptacle for connecting to an external ferrule, with a window adjacent to the lens.

4. The optical module of claim 1, further comprising a matching resistor on the flexible printed circuit board.

5. The optical module of claim 1, wherein the semiconductor chip comprises at least one of an electro-absorption modulated laser, a capacitor, a photodiode, a laser diode, or a thermistor.

6. The optical module of claim 1, wherein the flexible printed circuit board comprises:
a conductive line;
a lower ground line; and
an insulation layer between the conductive line and the lower ground line,
wherein the conductive line comprises a signal transmission line, an upper ground line, and an electrode line.

7. The optical module of claim 6, wherein
the flexible printed circuit board has via holes for electrically connecting the upper ground line with the lower ground line; and
the upper ground line and the lower ground line are electrically connected to each other through a conductive material filling at least a portion of the via holes.

8. The optical module of claim 6, wherein the lower ground line of the flexible printed circuit board is electrically connected to the optical bench.

9. The optical module of claim 6, wherein the signal transmission line and the upper ground line are a coplanar waveguide or a microstrip line.

10. The optical module of claim 1, wherein the metal optical bench comprises one of copper-tungsten, copper, kovar, an aluminum alloy, or a combination thereof.

11. The optical module of claim 1, wherein the silicon optical bench comprises:
a silicon substrate; and
a gold plating layer on the silicon substrate.

12. The optical module of claim 1, wherein the lens is a lens fixed with a metal housing or a lens of a bare chip shape.

* * * * *